United States Patent
Lee et al.

(10) Patent No.: US 8,411,805 B1
(45) Date of Patent: Apr. 2, 2013

(54) JOINT ESTIMATION OF CHANNEL AND PREAMBLE SEQUENCE FOR ORTHOGONAL FREQUENCY DIVISION MULTIPLEXING SYSTEMS

(75) Inventors: Jungwon Lee, Cupertino, CA (US); Jihwan P. Choi, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1250 days.

(21) Appl. No.: 12/169,986

(22) Filed: Jul. 9, 2008

Related U.S. Application Data

(60) Provisional application No. 60/955,752, filed on Aug. 14, 2007.

(51) Int. Cl.
*H04L 27/06* (2006.01)
(52) U.S. Cl. ............... 375/341; 375/316; 375/340
(58) Field of Classification Search .......... 375/136, 375/147, 340, 341, 267, 316, 350, 148, 260; 370/203, 208, 329, 410, 210, 328; 455/130
See application file for complete search history.

(56) References Cited

U.S. PATENT DOCUMENTS

| | | | |
|---|---|---|---|
| 6,795,392 B1 * | 9/2004 | Li et al. | 370/210 |
| 6,990,061 B2 * | 1/2006 | Deneire et al. | 370/210 |
| 7,161,896 B1 * | 1/2007 | Hart et al. | 370/206 |
| 7,359,311 B1 * | 4/2008 | Paranjpe et al. | 370/203 |
| 7,376,210 B2 * | 5/2008 | Kim et al. | 375/350 |
| 7,397,758 B1 * | 7/2008 | Hart et al. | 370/208 |
| 7,630,465 B2 * | 12/2009 | Nieto | 375/350 |
| 2004/0234004 A1 * | 11/2004 | Ketchum et al. | 375/267 |
| 2005/0105647 A1 * | 5/2005 | Wilhelmsson et al. | 375/316 |
| 2005/0195763 A1 * | 9/2005 | Kadous et al. | 370/328 |
| 2005/0265490 A1 * | 12/2005 | Sestok et al. | 375/340 |
| 2006/0128326 A1 * | 6/2006 | Pietraski | 455/130 |
| 2006/0269016 A1 * | 11/2006 | Long et al. | 375/340 |
| 2006/0274820 A1 * | 12/2006 | Walton et al. | 375/148 |
| 2007/0280366 A1 * | 12/2007 | Aytur et al. | 375/260 |

OTHER PUBLICATIONS

IEEE Std 802.16e™-2005 and IEEE Std 802.16™-2004/Cor1-2005 (Amendment and Corrigendum to IEEE Std 802.16-2004); IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Computer Society and the IEEE Microwave Theory and Techniques Society; Sponsored by the LAN/MAN Standards Committee; Feb. 28, 2006; 861 pages.
Joint Maximum Likelihood Estimation of Channel and Preamble Sequence for WiMax Systems; Revised Oct. 4, 2007; Jungwon Lee, Jihwan P. Choi and Hui-Ling Lou; 25 pages.
U.S. Appl. No. 11/725,039, filed Mar. 16, 2007, Lee et al.

\* cited by examiner

*Primary Examiner* — Daniel Washburn
*Assistant Examiner* — Fitwi Hailegiorgis

(57) ABSTRACT

A mobile station (MS) includes an estimation module, a filter module, and a filter selection module. The estimation module receives an input signal having subcarriers and generates first channel estimates based on the input signal. The subcarriers are selectively used by a base station (BS) to transmit preamble sequences when communicating with the MS. The filter module includes first and second filters. One of the first and second filters selectively filters the first channel estimates and generates second channel estimates. The filter selection module selects the one of the first and second filters based on a number of the subcarriers used to transmit the preamble sequences.

32 Claims, 12 Drawing Sheets

Table 309a—Preamble modulation series per segment and IDcell for the 1K FFT mode

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E35AC8ACF7D64AB4A33C467001F3B2 |
| 2 | 2 | 0 | 0x1C75D30B2DF72CEC9117A0BD8EAF8E0502461FC07456AC906ADE03E9B5AB5E1D3F98C6E |
| 3 | 3 | 0 | 0x5F9A2E5CA7CC69A5227104FB1CC2262809F3B10D0542B9BDFDA4A73A7046096DF0E8D3D |
| 4 | 4 | 0 | 0x82F8A0AB918138D84BB86224F6C342D81BC8BFE791CA9EB54096159D672E91C6E13032F |
| 5 | 5 | 0 | 0xEE27E59B84CCF15BB1565EF90D478CD2C49EE8A70DE368EED7C9420B0C6FFAF9AF035FC |
| 6 | 6 | 0 | 0xC1DF5AE28D1CA6A8917BCDAF4E73BD93F91C44F93C3F12F0132FB643EFD5885C8B2BCB |
| 7 | 7 | 0 | 0xFCA36CCCF7F3E0602696DF745A68DB948C57DFA9575BEA1F05725C42155898F0A63A248 |
| ... | ... | ... | ... |

JOINT ESTIMATION OF CHANNEL AND PREAMBLE SEQUENCE FOR ORTHOGONAL FREQUENCY DIVISION MULTIPLEXING SYSTEMS

CROSS-REFERENCE TO RELATED APPLICATIONS

This application claims the benefit of U.S. Provisional Application No. 60/955,752, filed on Aug. 14, 2007. The disclosure of the above application is incorporated herein by reference in its entirety.

FIELD

The present disclosure relates to communication systems, and more particularly to joint estimation of channel and preamble sequence in systems using orthogonal frequency domain multiplexing (OFDM).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a typical communication system 10 comprises an information source 12, a transmitter 13, a communication channel 20, a receiver 27, and a destination 28. The transmitter 13 comprises a source encoder 14, a channel encoder 16, and a modulator 18. The receiver 27 comprises a demodulator 22, a channel decoder 24, and a source decoder 26.

The information source 12 may be an analog source such as a sensor that outputs information as continuous waveforms or a digital source such as a computer that outputs information in a digital form. The source encoder 14 converts the output of the information source 12 into a sequence of binary digits (bits) called an information sequence u. The channel encoder 16 converts the information sequence u into a discrete encoded sequence v called a codeword. The modulator 18 transforms the codeword into a waveform of duration T seconds that is suitable for transmission.

The waveform output by the modulator 18 is transmitted via the communication channel 20. Typical examples of the communication channel 20 are telephone lines, wireless communication channels, optical fiber cables, etc. Noise, such as electromagnetic interference, inter-channel crosstalk, etc., may corrupt the waveform.

The demodulator 22 receives the waveform. The demodulator 22 processes each waveform and generates a received sequence r that is either a discrete (quantized) or a continuous output. The channel decoder 24 converts the received sequence r into a binary sequence u' called an estimated information sequence. The source decoder 26 converts u' into an estimate of the output of the information source 12 and delivers the estimate to the destination 28. The estimate may be a faithful reproduction of the output of the information source 12 when u' resembles u despite decoding errors that may be caused by the noise.

Communication systems use different modulation schemes to modulate and transmit data. For example, a radio frequency (RF) carrier may be modulated using techniques such as frequency modulation, phase modulation, etc. In wireline communication systems, a transmitted signal generally travels along a path in a transmission line between a transmitter and a receiver. In wireless communication systems, however, a transmitted signal may travel along multiple paths. This is because the transmitted signal may be reflected and deflected by objects such as buildings, towers, airplanes, cars, etc., before the transmitted signal reaches a receiver. Each path may be of different length. Thus, the receiver may receive multiple versions of the transmitted signal. The multiple versions may interfere with each other causing inter symbol interference (ISI). Thus, retrieving original data from the transmitted signal may be difficult.

To alleviate this problem, wireless communication systems often use a modulation scheme called orthogonal frequency division multiplexing (OFDM). In OFDM, a wideband carrier signal is converted into a series of independent narrowband sub-carrier signals that are adjacent to each other in frequency domain. Data to be transmitted is split into multiple parallel data streams. Each data stream is modulated using a sub-carrier. A channel over which the modulated data is transmitted comprises a sum of the narrowband sub-carrier signals, which may overlap.

When each sub-carrier closely resembles a rectangular pulse, modulation can be easily performed by Inverse Discrete Fourier Transform (IDFT), which can be efficiently implemented as an Inverse Fast Fourier Transform (IFFT). When IFFT is used, the spacing of sub-carriers in the frequency domain is such that when the receiver processes a received signal at a particular frequency, all other signals are nearly zero at that frequency, and ISI is avoided. This property is called orthogonality, and hence the modulation scheme is called orthogonal frequency division multiplexing (OFDM).

Referring now to FIGS. 2A-2C, a wireless communication system 50 may comprise base stations BS1, BS2, and BS3 (collectively BS) and one or more mobile stations (MS). Each BS may comprise a processor 30, a medium access controller (MAC) 32, a physical layer (PHY) module 34, and an antenna 36 as shown in FIG. 2B. Similarly, each MS may comprise a processor 40, a MAC 42, a PHY module 44, and an antenna 46 as shown in FIG. 2C. The PHY modules 34 and 44 may comprise RF transceivers (not shown) that transmit and receive data via antennas 36 and 46, respectively. Each BS and MS may transmit and receive data while the MS moves relative to the BS.

Specifically, each BS may transmit data using orthogonal frequency division multiplexing access (OFDMA) system. Each BS may transmit data typically in three segments: SEG1, SEG2, and SEG3. The MS, which moves relative to each BS, may receive data from one or more base stations depending on the location of the MS relative to each BS. For example, the MS may receive data from SEG 3 of BS1 and SEG 2 of BS2 when the MS is located as shown in FIG. 2A.

Relative motion between MS and BS may cause Doppler shifts in signals received by the MS. This can be problematic since systems using OFDMA are inherently sensitive to carrier frequency offsets (CFO). Therefore, pilot tones are generally used for channel estimation refinement. For example, some of the sub-carriers may be designated as pilot tones for correcting residual frequency offset errors.

Additionally, the PHY module 34 of each BS typically adds a preamble to a data frame that is to be transmitted. Specifically, the PHY module 34 modulates and encodes the data frame comprising the preamble at a data rate specified by the MAC 34 and transmits the data frame. When the PHY module 44 of the MS receives the data frame, the PHY module 44 uses the preamble in the data frame to detect a beginning of packet transmission and to synchronize to a transmitter clock of the BS.

According to the I.E.E.E. standard 802.16e, which is incorporated herein by reference in its entirety, a first symbol in the data frame transmitted by the BS is a preamble symbol from a preamble sequence. The preamble sequence typically contains an identifier called IDcell, which is a cell ID of the BS, and segment information. The BS selects the preamble sequence based on the IDcell and the segment number of the BS. Each BS may select different preamble sequences. Additionally, each BS may select preamble sequences that are distinct among the segments of that BS.

The BS modulates multiple sub-carriers with the selected preamble sequence. Thereafter, the BS performs IFFT, adds a cyclic prefix, and transmits a data frame. The MS uses the cyclic prefix to perform symbol timing and fractional carrier frequency synchronization. Unless the MS knows the preamble sequence, however, the MS cannot associate itself to a particular segment of a particular BS.

SUMMARY

A mobile station (MS) comprises an estimation module, a filter module, and a filter selection module. The estimation module receives an input signal having subcarriers and generates first channel estimates based on the input signal. The subcarriers are selectively used by a base station (BS) to transmit preamble sequences when communicating with the MS. The filter module includes first and second filters. One of the first and second filters selectively filters the first channel estimates and generates second channel estimates. The filter selection module selects the one of the first and second filters based on a number of the subcarriers used to transmit the preamble sequences.

In another feature, the first and second filters filter the first channel estimates and generate the second channel estimates in a time domain and a frequency domain, respectively.

In another feature, the filter selection module selects the first filter when all of the subcarriers are used to transmit the preamble sequences.

In another feature, the filter selection module selects the first filter when every $Q^{th}$ of the subcarriers is used to transmit the preamble sequences, where Q is an integer greater than 1.

In another feature, the first filter includes an Inverse Fast Fourier Transform (IFFT) module that filters the first channel estimates and that generates the second channel estimates.

In other features, the first filter has a time domain response of a low-pass filter, and the second filter has a frequency domain response of a smoothing filter.

In another feature, when the number of the subcarriers is N and when L sets of M of the N subcarriers are used to transmit the preamble sequences, the filter selection module selects the second filter, where N, M, and L are integers, N and M are greater than 1, $L \geq 1$, and $N > M > L$.

In another feature, the second filter includes a matrix filter module that generates L filter matrices based on the input signal, that filters the first channel estimates, and that generates the second channel estimates based on the L filter matrices.

In another feature, the MS further comprises a control module that generates a metric based on the first and second channel estimates and that generates joint maximum likelihood (ML) estimates of one of the preamble sequences and channel based on the metric.

In another feature, the control module generates the joint ML estimates by selecting a preamble sequence index that minimizes the metric.

In another feature, the control module detects a segment that transmitted the one of the preamble sequences based on at least one of the metric and the joint ML estimates.

In another feature, the control module generates the joint ML estimates based on at least one of a joint maximum likelihood (ML) estimator and a minimum mean square error (MMSE) estimator.

In another feature, the control module selects the at least one of the joint ML estimator and the MMSE estimator based on the number of the subcarriers used to transmit the preamble sequences.

In another feature, the estimation module generates the first channel estimates by dividing the input signal by the preamble sequences.

In another feature, the subcarriers are selectively modulated with the preamble sequences using Orthogonal Frequency Division Multiplexing (OFDM) by the BS.

In still other features, a method comprises receiving an input signal having subcarriers that are selectively used to transmit preamble sequences and generating first channel estimates based on the input signal. The method further comprises selecting one of first and second filters based on a number of the subcarriers used to transmit the preamble sequences, filtering the first channel estimates using the one of the first and second filters, and generating second channel estimates.

In another feature, the method further comprises generating the second channel estimates by filtering the first channel estimates in a time domain using the first filter.

In another feature, the method further comprises generating the second channel estimates by filtering the first channel estimates in a frequency domain using the second filter.

In another feature, the method further comprises selecting the first filter when all of the subcarriers are used to transmit the preamble sequences.

In another feature, the method further comprises selecting the first filter when every $Q^{th}$ of the subcarriers is used to transmit the preamble sequences, where Q is an integer greater than 1.

In another feature, the method further comprises generating the second channel estimates by filtering the first channel estimates using an Inverse Fast Fourier Transform (IFFT).

In another feature, the method further comprises generating the second channel estimates by filtering the first channel estimates using the first filter having a time domain response of a low-pass filter.

In another feature, the method further comprises generating the second channel estimates by filtering the first channel estimates using the second filter having a frequency domain response of a smoothing filter.

In another feature, the method further comprises selecting the second filter when the number of the subcarriers is N and when L sets of M of the N subcarriers are used to transmit the preamble sequences, where N, M, and L are integers, N and M are greater than 1, $L \geq 1$, and $N > M > L$.

In another feature, the method further comprises generating L filter matrices based on the input signal and generating the second channel estimates by filtering the first channel estimates based on the L filter matrices.

In another feature, the method further comprises generating a metric based on the first and second channel estimates and generating joint maximum likelihood (ML) estimates of one of the preamble sequences and channel based on the metric.

In another feature, the method further comprises generating the joint ML estimates by selecting a preamble sequence index that minimizes the metric.

In another feature, the method further comprises detecting a segment that transmitted the one of the preamble sequences based on at least one of the metric and the joint ML estimates.

In another feature, the method further comprises generating the joint ML estimates based on at least one of a joint maximum likelihood (ML) estimator and a minimum mean square error (MMSE) estimator.

In another feature, the method further comprises selecting the at least one of the joint ML estimator and the MMSE estimator based on the number of the subcarriers used to transmit the preamble sequences.

In another feature, the method further comprises generating the first channel estimates by dividing the input signal by the preamble sequences.

In another feature, the method further comprises modulating the subcarriers with the preamble sequences using Orthogonal Frequency Division Multiplexing (OFDM).

In still other features, a mobile station (MS) comprises estimation means for receiving an input signal having subcarriers and for generating first channel estimates based on the input signal. The subcarriers are selectively used by a base station (BS) to transmit preamble sequences when communicating with the MS. The MS further comprises first and second filtering means for selectively filtering the first channel estimates and generates second channel estimates. The MS further comprises filter selection means for selecting one of the first and second filters based on a number of the subcarriers used to transmit the preamble sequences.

In another feature, the first and second filtering means filter the first channel estimates and generate the second channel estimates in a time domain and a frequency domain, respectively.

In another feature, the filter selection means selects the first filtering means when all of the subcarriers are used to transmit the preamble sequences.

In another feature, the filter selection means selects the first filtering means when every $Q^{th}$ of the subcarriers is used to transmit the preamble sequences, where Q is an integer greater than 1.

In another feature, the first filtering means includes an Inverse Fast Fourier Transform (IFFT) means for filtering the first channel estimates and that generates the second channel estimates.

In other features, the first filtering means has a time domain response of a low-pass filter, and the second filtering means has a frequency domain response of a smoothing filter.

In another feature, when the number of the subcarriers is N and when L sets of M of the N subcarriers are used to transmit the preamble sequences, the filter selection means selects the second filtering means, where N, M, and L are integers, N and M are greater than 1, $L \geq 1$, and N>M>L.

In another feature, the second filtering means includes matrix filter means for generating L filter matrices based on the input signal, for filtering the first channel estimates, and for generating the second channel estimates based on the L filter matrices.

In another feature, the MS further comprises control means for generating a metric based on the first and second channel estimates and for generating joint maximum likelihood (ML) estimates of one of the preamble sequences and channel based on the metric.

In another feature, the control means generates the joint ML estimates by selecting a preamble sequence index that minimizes the metric.

In another feature, the control means detects a segment that transmitted the one of the preamble sequences based on at least one of the metric and the joint ML estimates.

In another feature, the control means generates the joint ML estimates based on at least one of a joint maximum likelihood (ML) estimator and a minimum mean square error (MMSE) estimator.

In another feature, the control means selects the at least one of the joint ML estimator and the MMSE estimator based on the number of the subcarriers used to transmit the preamble sequences.

In another feature, the estimation means generates the first channel estimates by dividing the input signal by the preamble sequences.

In another feature, the subcarriers are selectively modulated with the preamble sequences using Orthogonal Frequency Division Multiplexing (OFDM) by the BS.

In still other features, a computer program stored on a computer-readable medium and executed by a processor comprises receiving an input signal having subcarriers that are selectively used to transmit preamble sequences and generating first channel estimates based on the input signal. The computer program further comprises selecting one of first and second filters based on a number of the subcarriers used to transmit the preamble sequences, filtering the first channel estimates using the one of the first and second filters, and generating second channel estimates.

In another feature, the computer program further comprises generating the second channel estimates by filtering the first channel estimates in a time domain using the first filter.

In another feature, the computer program further comprises generating the second channel estimates by filtering the first channel estimates in a frequency domain using the second filter.

In another feature, the computer program further comprises selecting the first filter when all of the subcarriers are used to transmit the preamble sequences.

In another feature, the computer program further comprises selecting the first filter when every $Q^{th}$ of the subcarriers is used to transmit the preamble sequences, where Q is an integer greater than 1.

In another feature, the computer program further comprises generating the second channel estimates by filtering the first channel estimates using an Inverse Fast Fourier Transform (IFFT).

In another feature, the computer program further comprises generating the second channel estimates by filtering the first channel estimates using the first filter having a time domain response of a low-pass filter.

In another feature, the computer program further comprises generating the second channel estimates by filtering the first channel estimates using the second filter having a frequency domain response of a smoothing filter.

In another feature, the computer program further comprises selecting the second filter when the number of the subcarriers is N and when L sets of M of the N subcarriers are used to transmit the preamble sequences, where N, M, and L are integers, N and M are greater than 1, $L \geq 1$, and N>M>L.

In another feature, the computer program further comprises generating L filter matrices based on the input signal and generating the second channel estimates by filtering the first channel estimates based on the L filter matrices.

In another feature, the computer program further comprises generating a metric based on the first and second channel estimates and generating joint maximum likelihood (ML) estimates of one of the preamble sequences and channel based on the metric.

In another feature, the computer program further comprises generating the joint ML estimates by selecting a preamble sequence index that minimizes the metric.

In another feature, the computer program further comprises detecting a segment that transmitted the one of the preamble sequences based on at least one of the metric and the joint ML estimates.

In another feature, the computer program further comprises generating the joint ML estimates based on at least one of a joint maximum likelihood (ML) estimator and a minimum mean square error (MMSE) estimator.

In another feature, the computer program further comprises selecting the at least one of the joint ML estimator and the MMSE estimator based on the number of the subcarriers used to transmit the preamble sequences.

In another feature, the computer program further comprises generating the first channel estimates by dividing the input signal by the preamble sequences.

In another feature, the computer program further comprises modulating the subcarriers with the preamble sequences using Orthogonal Frequency Division Multiplexing (OFDM).

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table showing preamble sequences used by base stations of FIG. 3 to transmit data;

DETAILED DESCRIPTION

Figure 1:
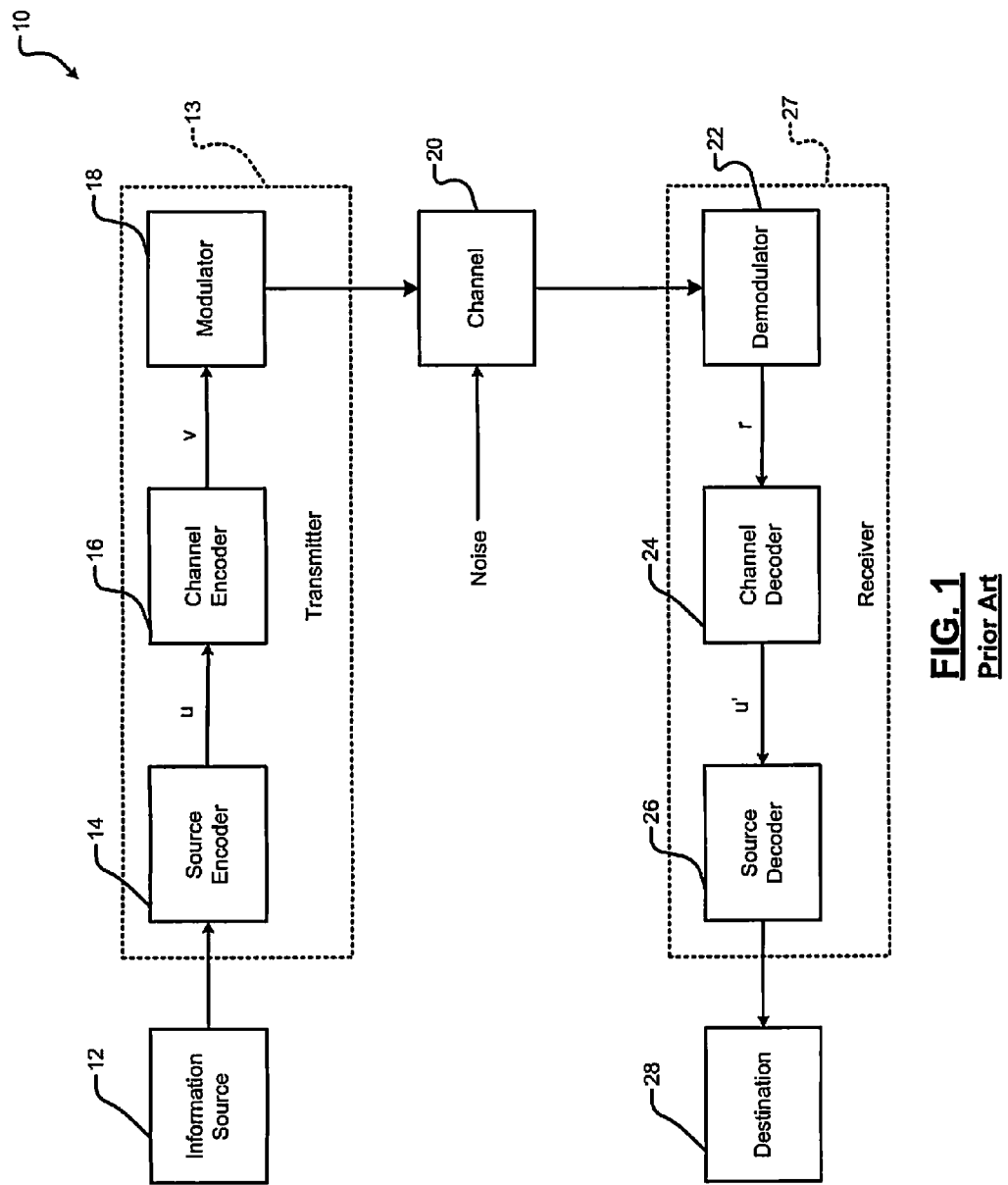
FIG. 1 is a functional block diagram of an exemplary communication system according to the prior art.
Figure 2A:
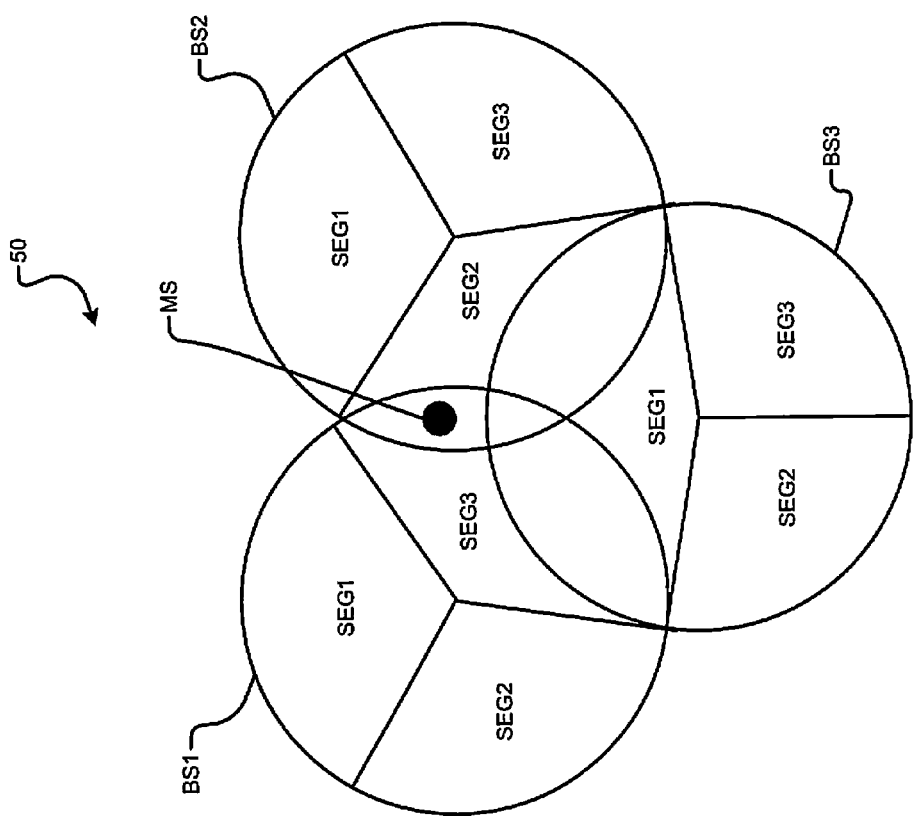
FIG. 2A is a schematic representation of an exemplary wireless communication system comprising three base stations and a mobile station according to the prior art.
Figure 2B:
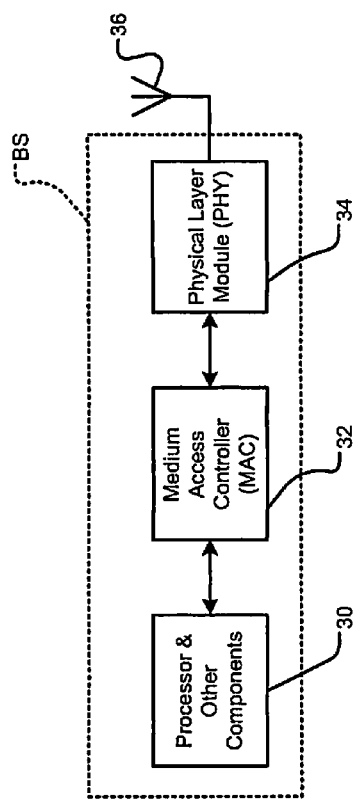
FIG. 2B is a functional block diagram of an exemplary base station utilized in the system of FIG. 2A.
Figure 2C:
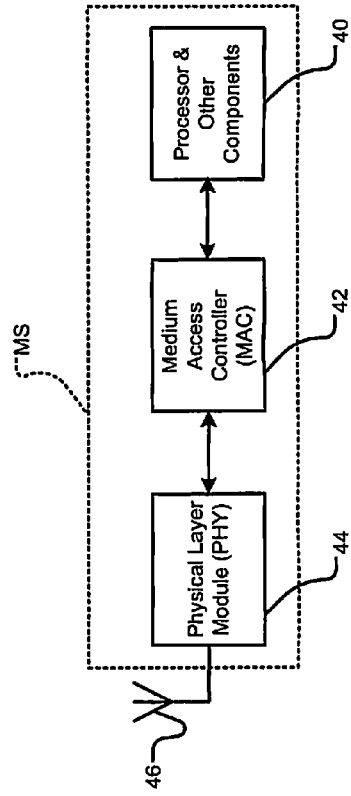
FIG. 2C is a functional block diagram of an exemplary mobile station utilized in the system of FIG. 2A.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 3:
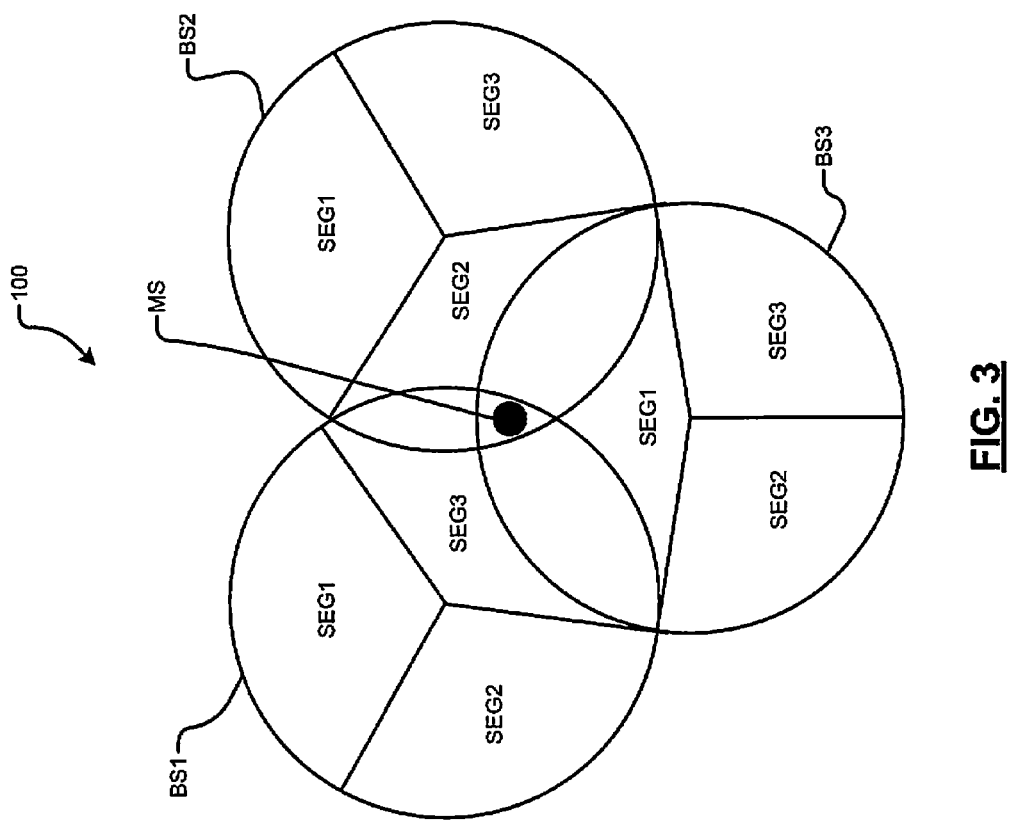
FIG. 3 is a schematic representation of an exemplary wireless communication system comprising three base stations and a mobile station.

Referring now to FIG. 3, a wireless communication system 100 may comprise base stations BS1, BS2, and BS3 (collectively BS) and one or more mobile stations (MS). Generally, one MS may communicate with up to three adjacent base stations. Each BS may transmit data that is modulated using an orthogonal frequency division multiplexing access (OFDMA) system.

Specifically, each BS may transmit data in three segments: SEG1, SEG2, and SEG3. The MS, which may move relative to each BS, may receive data from one or more base stations depending on the location of the MS relative to each BS. For example, the MS may receive data from SEG 3 of BS1, SEG 2 of BS2, and/or SEG 1 of BS3 when the MS is located as shown.

When a receiver in the MS is turned on (i.e., when the MS is powered up), the MS may associate with an appropriate segment of a corresponding BS depending on the location of the MS. The MS, however, can process data in a frame transmitted by a BS only if the MS can correctly detect a preamble sequence in the frame. Specifically, the MS can perform frame synchronization and retrieval of a cell ID (IDcell) and a segment number of the BS from the frame if the MS can detect the preamble sequence in the frame.

Referring now to FIG. 4, OFDMA systems may use 1024 and 512 sub-carriers to modulate and transmit data. OFDMA systems using 1024 and 512 sub-carriers are generally referred to as OFDMA systems having 1024 and 512 FFT modes, respectively. Additionally, I.E.E.E. 802.16e supports 128 FFT and 2048 FFT modes.

A total of 114 preamble sequences exist for OFDMA systems that use fast Fourier transforms (FFT) to modulate 1024 and 512 sub-carriers. Each preamble sequence is unique. That is, each preamble sequence is distinct from another preamble sequence and is identified by an index number. The index number may be referred to as preamble sequence index. Each preamble sequence is 284 and 143 bits (symbols) long for 1024 and 512 FFT modes, respectively.

Since one MS may typically communicate with up to three base stations, each BS modulates every third sub-carrier. That is, each BS modulates one of every three sub-carriers. Additionally, each BS uses only one bit of the total bits in a preamble sequence when modulating every third sub-carrier. For example, in 1024 FFT mode, the BS may use bit numbers 1, 2, 3, . . . , etc., of the 284 bits in a preamble sequence to modulate sub-carrier numbers 1, 4, 7, . . . , etc., of the 1024 sub-carriers, respectively.

Each BS may use the same set of sub-carriers. Each segment in a BS, however, uses distinct sub-carriers at least for preamble purposes. For example, for each BS, segment 1 (SEG1) may use sub-carriers 0, 3, 6, 9, ..., etc.; segment 2 (SEG2) may use sub-carriers 1, 4, 7, 10, ..., etc.; and segment 3 (SEG3) may use sub-carriers 2, 5, 8, 11, ..., etc.

Consequently, the MS receives distinct signals from each BS. For example, the MS may receive signals from SEG2 of BS2 on sub-carriers 1, 4, 7, 10, ..., etc., from SEG1 of BS3 on sub-carriers 0, 3, 6, 9, ..., etc., and from SEG 3 of BS1 on sub-carriers 2, 5, 8, 11, ..., etc. Thus, the signals received by the MS may not interfere with each other since their sub-carriers are distinct.

A set of sub-carriers for segment n may be mathematically expressed as follows.

$$PreambleCarrierSet_n = n + 3k$$

where $0 \leq k \leq 283$ for 1024 FFT mode, and $0 \leq k \leq 142$ for 512 FFT mode. Additionally, there may be 86 guard sub-carriers on the left and right ends of the spectrum in 1024 FFT mode. In the 512 FFT mode, there may be 42 guard sub-carriers on the left end and 41 guard sub-carriers on the right end.

Typically, when the receiver in the MS is turned on, the MS initially performs symbol timing and carrier frequency synchronization before the MS can detect a preamble sequence. The MS may perform these tasks using a cyclic prefix in the data frame. Thereafter, the MS determines whether a first symbol in the frame is a preamble symbol. If the first symbol is a preamble symbol, then the MS determines which preamble sequence is present in the frame. Once the MS determines the preamble sequence, the MS can associate with a corresponding segment of an appropriate BS.

Symbols in preamble sequences (i.e., preamble symbols) typically have higher energy than data symbols. For example, the energy of the preamble symbols is typically 8/3 times (i.e., 4.26 dB higher than) the energy of data symbols. This is useful in distinguishing preamble symbols from data symbols.

Additionally, the preamble sequences are almost orthogonal. That is, a cross-correlation between any two preamble sequences is very small. For example, the cross-correlation is typically less than 0.2. This is useful in distinguishing individual preamble sequences from one another. As shown in the table in FIG. 4, if the MS detects a preamble sequence having an index 0, then the MS associates with segment 0 of BS having cell ID 0, and so on.

Examples of wireless OFDMA systems include Worldwide Interoperability for Microwave Access (WiMAX) wireless networks. Base stations and mobile stations employing wireless OFDMA systems may be configured to operate in WiMAX wireless networks. WiMAX is a standards-based technology that enables wireless broadband access as an alternative to wired broadband like cable and DSL. WiMAX provides fixed, nomadic, portable, and mobile wireless connectivity without a direct line-of-sight with a base station. WiMAX technology may be incorporated in portable electronic devices such as notebook computers, personal digital assistants (PDAs), etc.

When WiMAX-compliant mobile stations receive signals, a preamble sequence in the received signals can be detected and identified when the channel is known. Specifically, the received signals can be equalized by the channel and can be correlated with all preamble sequences to find a match. Alternately, when the preamble sequence received in the received signal is known, the channel can be calculated. Specifically, the preamble sequence is initially estimated, and the channel is calculated based on the estimated preamble sequence. In WiMAX systems, however, preamble sequences transmitted by base stations and channel are unknown to the mobile stations.

The systems and methods described in the present disclosure estimate channel and preamble sequence using low-complexity maximum likelihood (ML) joint estimators. The preamble is usually the first symbol received by the MS in an OFDM frame. The MS does not know the channel when the preamble is received. Not knowing the channel complicates detecting preamble sequence index in WiMAX systems. The MS, however, knows all the preamble sequences that can be possibly transmitted. Accordingly, the MS can estimate a preamble sequence that has been transmitted without knowledge of channel. Specifically, the MS can jointly estimate the channel and preamble sequence using a joint maximum likelihood (ML) estimator. Additionally, the joint estimation automatically detects the segment that transmitted the preamble sequence.

The detailed description is organized as follows. A decoupled estimator and a joint ML estimator are initially discussed. Specifically, the decoupled estimator that decouples estimation of preamble sequence from estimation of channel is first discussed. Then the joint ML estimator is described. Subsequently, four different low-complexity joint ML estimators that differ based on the pilot subcarrier locations used to transmit the preamble sequences are proposed. The low-complexity joint ML estimators also detect segments in WiMAX systems. The low-complexity joint ML estimators perform fewer calculations and processing than the decoupled and joint ML estimators and are therefore more efficient than the decoupled and joint ML estimators. Thereafter, systems and methods that estimate the channel and preamble sequence using the low-complexity joint ML estimators are described. Finally, mathematical proofs of the low-complexity joint ML estimators are enumerated.

The various estimators referred to herein are discussed in a paper entitled "Joint Maximum Likelihood Estimation of Channel and Preamble Sequence for WiMAX Systems" authored by Jungwon Lee et al. The paper was submitted to I.E.E.E. on May 31, 2007 and was accepted for publication on Apr. 14, 2008. The paper is incorporated herein by reference in its entirety.

Before discussing the various estimators in detail, the mathematical notations and models used for the received signal are introduced. The notations include uppercase and lowercase letters that denote frequency domain signals and time domain signals, respectively. Boldface characters denote random quantities. No distinction is made among a scalar, a vector, and a matrix.

Typically, OFDM systems transmit information that includes a series of OFDM symbols. An inverse discrete Fourier transform (IDFT) is performed on N information symbols X[m,k] for k=0,1, ..., N−1. m represents a OFDM symbol number (i.e., a symbol index). k represents a subcarrier number (i.e., a subcarrier index). Cyclic prefix samples of length $N_g$ are prepended.

The time-domain samples x[m,n] of the m-th OFDM symbol can be mathematically expressed as follows:

$$x[m,n] = \begin{cases} \frac{1}{N}\sum_{k=0}^{N-1} X[m,k]e^{j\frac{2\pi kn}{N}}, \\ \text{for} -N_g \leq n \leq N-1 \\ 0, \quad \text{elsewhere.} \end{cases}$$

The OFDM symbol x[m,n] is transmitted through a channel h[m,n]. The OFDM symbol x[m,n] may be corrupted by Gaussian noise z[m,n]. The channel h[m,n] may be block-stationary (i.e., time-invariant) during each OFDM symbol. Additionally, the channel h[m,n] may have finite duration such that h[m,n]=0 for n<0 and n>$N_g$.

An output y[m,n] of the channel can be represented as $$y[m, n] = \sum_{r=0}^{N_g} h[m, r]x[m, n - r] + z[m, n],$$

where z[m,n] is the additive white Gaussian noise with variance $\sigma_z^2$.

When the preamble sequence is not longer than one OFDM symbol, only one OFDM symbol may be processed to estimate the preamble sequence and the channel. Since only one OFDM symbol is considered, the OFDM symbol index m is hereinafter omitted.

A mathematical model for the received signal is now enumerated. A signal received by the MS in the frequency domain can be represented as follows:

$$Y[k]=H[k]X_i[k]+Z[k],$$

where $$H[k] = \frac{1}{\sqrt{N}} \sum_{n=0}^{N_g} h[n]\exp\left(\frac{-j2\pi kn}{N}\right),$$

$X_i[k]$ is the k-th value of the i-th preamble sequence. Z[k] is the Gaussian noise.

Typically, subcarriers include pilot subcarriers and null subcarriers. Null subcarriers have zero values. Pilot subcarriers have a magnitude of one and an arbitrary phase. Accordingly, $X_i[k]$ may be represented by the following equation:

$$X_i[k] = \begin{cases} 0, & k \in N_i \\ \exp(j\theta_i[k]), & k \in P_i, \end{cases}$$

where $N_i$ and $P_i$ are sets of null subcarrier indices and pilot subcarrier indices, respectively, for the preamble sequence index i. Thus, the pilot subcarrier indices and the null subcarrier indices can be different depending on the preamble sequence. This general representation includes pilot patterns of IEEE 802.16e systems, which defines three distinct sets of pilot locations.

Alternatively, the received signal can be expressed using a vector-matrix notation as follows:

$$Y=X_iH+Z,$$

where $$Y=[Y[0]Y[1]\ldots Y[N-1]]^T, H=[H[0]H[1]\ldots H[N-1]]^T, \text{ and } Z=[Z[0]Z[1]\ldots Z[N-1]]^T,$$

and $X_i$ is a diagonal matrix whose diagonal is given by $[X_i[0] X_i[1] \ldots X_i[N-1]]$.

Since H[k] is a discrete Fourier transform of h[n] and the channel is of finite duration, the received signal can be represented in terms of $h[h[0]h[1] \ldots h[N_g]]^T$ as follows:

$$Y=X_i\tilde{F}h+Z,$$

where $\tilde{F}$ is a submatrix of size N×($N_g$+1) of a discrete Fourier matrix F whose (m,n)-th element is $$F_{m,n} = \frac{1}{\sqrt{N}}\exp\left(-\frac{2\pi(m-1)(n-1)}{N}\right).$$

For notational convenience, $I_{m,n}$ is defined as follows. For m>n, $$I_{m,n} \triangleq \begin{bmatrix} I_n \\ O_{m-n,n} \end{bmatrix},$$

where $I_n$ an identity matrix of size n×n and $O_{m,n}$ is a zero matrix of size m×n, respectively. On the other hand, for m<n, $$I_{m,n} \triangleq [I_m O_{m,n-m}].$$

The Fourier submatrix $\tilde{F}$ can now be represented as $$\tilde{F}=FI_{N,N_g+1}.$$

The preamble sequence index may be detected without knowing the channel when the number of preamble sequences is smaller than the number of pilot subcarriers. In most systems, the number of preamble sequences is smaller than the number of pilot subcarriers. For example, in I.E.E.E. 802.16e systems with 1024 FFT size, the number of preamble sequences is 114, whereas the number of pilot subcarriers used for each preamble sequence is 852. Since the number of preamble sequences (114) is smaller than the number of pilot subcarriers used for each preamble sequence (852), the preamble sequence index can be estimated without knowing the channel.

The decoupled estimator and the joint ML estimator are now described in turn. The estimators use the vector-matrix model of the received signal and estimate the channel h and the preamble sequence index i as follows.

The decoupled estimator decouples estimating the preamble sequence index from estimating the channel. When the channel is known to the MS, and given Y[k]=Y[k], the ML estimator for estimating the preamble sequence index i is $$\hat{i} = \arg_i\min\left\{\sum_{k=0}^{N} |Y[k] - H[k]X_i[k]|^2\right\}.$$

Since $X_i[k]$ may have the same magnitude regardless of the preamble sequence, the ML estimator can be simplified as follows:

$$\hat{i} = \arg_i\max\left\{\Re\left\{\sum_{k=0}^{N} Y[k]H*[k]X_i^*[k]\right\}\right\}.$$

When the channel has the same magnitude and an unknown phase common for all subcarriers, H[k]=|H|exp(jθ). A joint ML estimator of the preamble sequence index i and the phase θ is given by the following:

$$\hat{\imath} = \arg_i \max \left\{ \left| \sum_{k=0}^{N} Y[k] X_i^*[k] \right| \right\},$$

and $$\hat{\theta} = \angle \left( \sum_{k=0}^{N} Y[k] X_i^*[k] \right).$$

This preamble sequence index estimator is applicable to a frequency-selective channel when the channel selectivity is small. For a channel having a considerable frequency-selectivity, the subcarriers may be partitioned into bands so that the frequency selectivity of the channel over a given band is small.

A frequency-selective channel can be modeled as a frequency-flat channel within a band having a fixed number of subcarriers as follows.

$$H[k] = |H_b| e^{j\theta_b} \text{ for } \frac{bN}{B} \le k \le \frac{(b+1)N}{B} - 1,$$

where $b=0,1,\ldots,B-1$, and B is the number of distinct frequency bands that divide the N subcarriers. A correlation can now be calculated separately within a band, and the magnitudes of the correlations can be summed over the bands as follows.

$$\hat{\imath} = \arg_i \max \left\{ \sum_{l=0}^{B-1} \left| \sum_{k=l(N/B)}^{(l+1)(N/B)-1} Y[k] X_i^*[k] \right| \right\}.$$

Although this estimator is not optimal for a general frequency-selective channel, this estimator can estimate the preamble sequence index without knowing the channel beforehand. After estimating the preamble sequence using this estimator, the channel can be estimated with the estimated preamble sequence using various methods such as the minimum mean square error (MMSE) and ML. Thus, this estimator decouples estimating the preamble sequence estimation from estimating the channel.

The joint ML estimator is now described. Given Y=Y, the channel h and the preamble sequence index i can be jointly estimated as follows. The joint ML estimation of the channel h and the preamble sequence index i can be represented as follows:

$$(\hat{h}, \hat{\imath}) = \underset{(h,i)}{\arg\max} f_{Y|h,i}(Y | h, i),$$

where $f_{Y|h,i}(Y|h,i)$ is a conditional probability density function of Y given h=h and i=i.

Since the background noise Z is a circularly symmetric complex Gaussian vector whose elements have means of zero and variances of $\sigma_z^2$, the conditional probability density function is given by $$f_{Y|h,i}(Y|h,i) = \frac{1}{(\pi \sigma_z^2)^N} \exp\left( -\frac{\|Y - X_i \tilde{F} h\|^2}{\sigma_z^2} \right).$$

Since the exponential function $e^{-x}$ is monotonically decreasing with respect to x, maximizing $f_{Y|h,i}(Y|h,i)$ is equivalent to minimizing the following square error:

$$S(h,i) = \|Y - X_i \tilde{F} h\|^2.$$

Accordingly, (h,i) that minimizes S(h,i) can be found in two steps. First, for each possible i, $\hat{h}_i$ that minimizes S(h,i) is found. Second, among the $\hat{h}_i$ found in the first step, $\hat{\imath}$ that minimizes $S(\hat{h}_i,i)$ is chosen. $\hat{h}(\hat{\imath})$ is selected as the estimate for h. In other words, $$\hat{h}_i = \arg_h \min\{S(h,i)\},$$

$$\hat{\imath}_i = \arg_i \min\{S(\hat{h}_i, i)\}, \text{ and}$$

$$\hat{h} = \hat{h}(\hat{\imath}).$$

The channel estimate $\hat{h}_i$ for a given i that minimizes S(h,i) can be easily derived using a least-squares estimation as follows. For notational convenience, let $A_i$ be a full rank matrix given by $A_i = X_i \tilde{F}$. Then $\hat{h}_i = A_i^\dagger Y$, where $A^\dagger$ represents a pseudo-inverse of A. That is, $A^\dagger A = I$. The pseudo-inverse $A^\dagger$ can be represented as $A_i^\dagger = (A_i^H A_i)^{-1} A_i^H$.

The corresponding square error $S(\hat{h}_i, i)$ for the channel estimate $\hat{h}_i$ is $S(\hat{h}_i, i) = \|Y - A_i A_i^\dagger Y\|^2$. For every i, the square error is evaluated and the preamble sequence index i that minimizes the square error is chosen with the corresponding channel estimate.

Wireless OFDM systems including WiMAX systems that jointly estimate channel and preamble sequence index by generating the pseudo-inverse of $A_i$ for each i may perform poorly due to the computational overhead associated with generating the pseudo-inverse of $A_i$ for each i. One way of reducing the overhead and improving performance is to employ the teachings of U.S. patent application Ser. No. 11/725,039 filed on Mar. 16, 2007, which is incorporated herein by reference in its entirety.

Specifically, initial channel estimates $H_i' = Y/X_i$ are first generated, where Y is the received signal, and $X_i$ is the transmitted signal with preamble sequence index i. Final channel estimates $H_i'' = f(H_i')$ are subsequently generated, where f is a linear filter or a weighted average of $H_i'$. A value of i for which a metric $\|H_i' - H_i''\|^2$ is minimum is the estimated preamble sequence index, and the corresponding $H_i''$ is the channel estimate. Selecting $\|H_i' - H_i''\|^2$ instead of $\|Y - A_i A_i^\dagger Y\|^2$ as the metric for joint ML estimation of channel and preamble sequence eliminates the computation of the pseudo-inverse of $A_i$ for each i.

Base stations typically use pilot patterns (i.e., specific subcarriers) to transmit preamble sequences. The present disclosure proposes four different pilot patterns wherein the base stations use specified subcarriers as pilot subcarriers to transmit preamble sequences. Based on the four pilot patterns, four additional ways of reducing the overhead of calculating the pseudo-inverse of $A_i$ are now discussed. Specifically, depending on the pilot pattern used, the MS uses a different filter to generate $H_i''$ from $H_i'$.

The four pilot patterns are first enumerated. In a first pattern, all subcarriers are used as pilot subcarriers. In a second pattern, a predetermined set of regularly spaced subcarriers (e.g., 1, 4, 7, 10, etc.) is used as pilot subcarriers. In a third pattern, arbitrary but fixed subcarriers (e.g., 1, 4, 5, 7, etc.) are used as pilot subcarriers. In a fourth pattern, different distinct sets of subcarriers are used as pilot subcarriers for different preamble sequences. For example, in WiMAX systems, 3 sets of subcarriers are used: a first set of subcarriers 1, 4, 7, etc.; a second set of subcarriers 2, 5, 8, etc.; and a third set of subcarriers 3, 6, 9, etc.

When the pilot pattern is of the first or second type, a low-pass type filter may be used in time domain to generate H" from H', and the pseudo-inverse of $A_i$ is not generated. When the pilot pattern is of the third or fourth type, a smoothing filter may be used in frequency domain to generate H" from H', and the pseudo-inverse of $A_i$ is generated only a limited number of times. For example, the pseudo-inverse of $A_i$ is generated only once when the third pattern is used, and only L times when L distinct sets of pilot subcarriers are used (e.g., L=3 for WiMAX systems), where L is an integer greater than 1.

Figure 5:
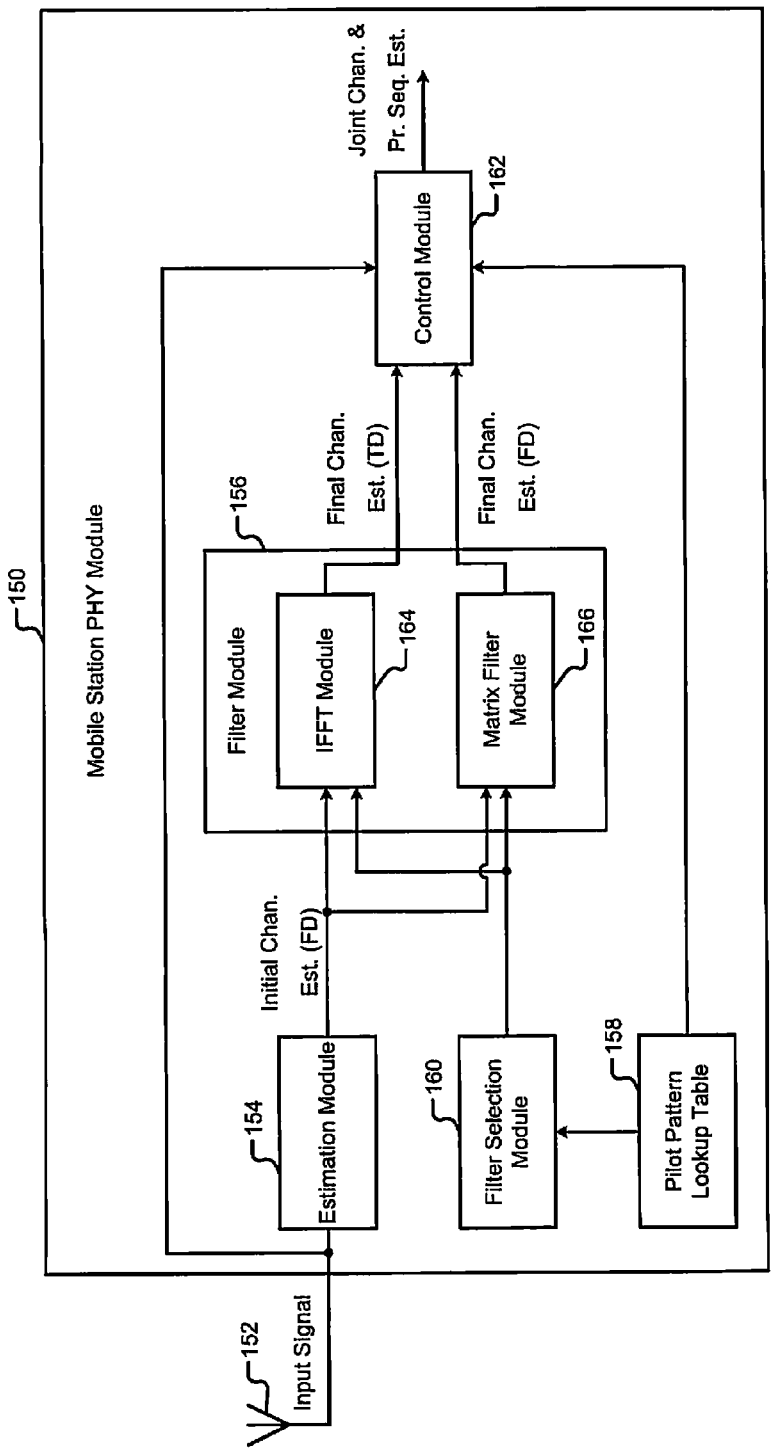
FIG. 5 is a functional block diagram of an exemplary system that jointly estimates channel and preamble sequence using low-complexity joint maximum likelihood (ML) estimators according to the present disclosure.

Referring now to FIG. 5, a system that estimates channel and preamble sequence using low-complexity joint ML estimators according to the present disclosure is shown. The system uses low-complexity joint ML estimators to jointly estimate channel and preamble sequence and to detect the segment that transmitted the detected preamble sequence. Specifically, the system uses different filters based on the pilot sub-carrier pattern used to transmit preamble sequences.

The system may be implemented by a PHY module 150 of an MS as shown. The PHY module 150 may receive an input signal via an antenna 152. The input signal received may be transmitted by a BS (not shown) using any one of the four pilot patterns.

The PHY module 150 may comprise an estimation module 154, a filter module 156, a pilot pattern lookup table 158, a filter selection module 160, and a control module 162. The estimation module 154 may receive the input signals and generate initial channel estimates in the frequency domain (i.e., $H_i'=Y/X_i$). The filter module 156 may include filters that filter the initial channel estimates and that generate final channel estimates (e.g., $H_i''$ in frequency domain). The pilot pattern lookup table 158 may store information about the pilot pattern used by the BS to transmit the preamble sequence. The filter selection module 160 may select one of the filters based on the pilot pattern used. The control module 162 may generate the metric $\|H_i'-H_i''\|^2$.

The metric $\|H_i'-H_i''\|^2$, also called a square error $S(h_i\hat{\,}, i)$, may be expressed by following equations for the four pilot patterns.

$$S(\hat{h}_i, i) = \|H_i' - H_i''\|^2$$

$$= \begin{cases} \|Y\|^2 - \|\hat{h}_i\|^2 & \text{(first pattern)} \\ \|WY\|^2 - \|\hat{h}_i\|^2 & \text{(second pattern)} \\ \|WY\|^2 - \|\hat{H}_{i,pilot}\|^2 & \text{(third pattern)} \\ \|W_iY\|^2 - \|\hat{H}_{i,pilot}\|^2 & \text{(fourth pattern)} \end{cases}$$

where W is a matrix that indicates pilot subcarrier locations.

The metric $\|H_i'-H_i''\|^2$ indicates a difference between the total power of the input signal and the total power of the final channel estimates. When Y is fixed, the value of the metric $\|H_i'-H_i''\|^2$ (i.e., the square error $S(h_i\hat{\,}, i)$) is minimum when the value of $\|h_i\hat{\,}\|^2$ or $\|H_i\hat{\,}_{pilot}\|^2$ is maximum. Selecting a preamble sequence index that minimizes the metric (i.e., the square error) is equivalent to selecting the preamble sequence index that maximizes the squared norm of the final channel estimates.

Accordingly, the control module 162 may select the value of i for which the metric $\|H_i'-H_i''\|^2$ is minimum or the value of $\|h_i\hat{\,}\|^2$ or $\|H_i\hat{\,}_{pilot}\|^2$ is maximum. The selected value of i is the estimated preamble sequence index detected in the input signal, and the corresponding value of $h_i\hat{\,}$ or $H_i\hat{\,}_{pilot}$ is the estimated channel.

The control module 162 may estimate i and channel using a ML estimator and/or a MMSE estimator depending on the pilot pattern used. The ML and/or MMSE estimator used may differ based on the pilot pattern used. The control module 162 may select the ML and/or MMSE estimator based on the pilot pattern used.

Traditionally, the MS detects a segment by calculating total power of possible pilot subcarriers and selecting the segment having maximum total power given by $\|h\hat{\,}\|^2$ or $\|H\hat{\,}_{pilot}\|^2$. Accordingly, when the control module 162 selects i for which the metric $\|H_i'-H_i''\|^2$ is minimum (i.e., for which $\|h_i\hat{\,}\|^2$ or $\|H_i\hat{\,}_{pilot}\|^2$ is maximum), the control module 162 automatically detects the segment that transmitted the detected preamble sequence denoted by the selected value of i. Thus, the control module 162 automatically detects the segment without any additional processing when the control module 162 estimates the channel and the preamble sequence.

More specifically, the filter module 156 may comprise an Inverse Fast Fourier Transform (IFFT) module 164 and a matrix filter module 166. When the first or the second pilot pattern is used, the filter selection module 160 selects the IFFT module 164 and deselects the matrix filter module 166. The IFFT module 164 generates the final estimates in the time domain by performing an IFFT operation on the initial channel estimates. No pseudo-inverse matrices are used. The control module 162 may perform all subsequent processing including generating the metric and jointly estimating channel and preamble sequence from the metric in the time domain.

Alternatively, when the third or the fourth pilot pattern is used, the filter selection module 160 may select the matrix filter module 166 and deselect the IFFT module 164. Additionally, the filter selection module 160 may communicate to the matrix filter module 166 whether the third or the fourth pilot pattern is used, and the number of distinct pilot subcarrier sets used when the fourth pilot pattern is used. For example, in WiMAX systems, the filter selection module 160 may indicate to the matrix filter module 166 that the number of distinct pilot subcarrier sets used is three.

Based on the information received from the filter selection module 160, the matrix filter module 166 may generate one or more pseudo-inverse matrices of the matrix $A_i$ to filter the initial channel estimates and generate the final channel estimates in the frequency domain. The control module 162 may perform all subsequent processing including generating the metric and jointly estimating channel and preamble sequence from the metric in the frequency domain. In some implementations, instead of generating the pseudo-inverse matrices, the matrix filter module 166 may simply store the pseudo-inverse matrices when the pilot patterns used are known.

Specifically, when the third pattern is used, only one fixed pattern of pilot subcarriers is used. Accordingly, the matrix filter module 166 may generate only one pseudo-inverse matrix based on the locations or positions of the subcarriers used as the pilot subcarriers. On the other hand, when the fourth pattern is used, the matrix filter module 166 may generate a number of pseudo-inverse matrices equal to the number of distinct pilot subcarrier sets used. For example, in WiMAX systems, the matrix filter module may generate three pseudo-inverse matrices since three distinct pilot subcarrier sets are used.

Thus, when either the third or the fourth patterns are used, the number of pseudo-inverse matrices used is limited. That is, the pseudo inverse matrices of $A_i$ are not generated for each i thereby reducing the computational complexity of estimating the channel and the preamble sequence. Accordingly, the joint estimation of channel and preamble sequence is called low-complexity ML joint estimation.

Figure 6B:
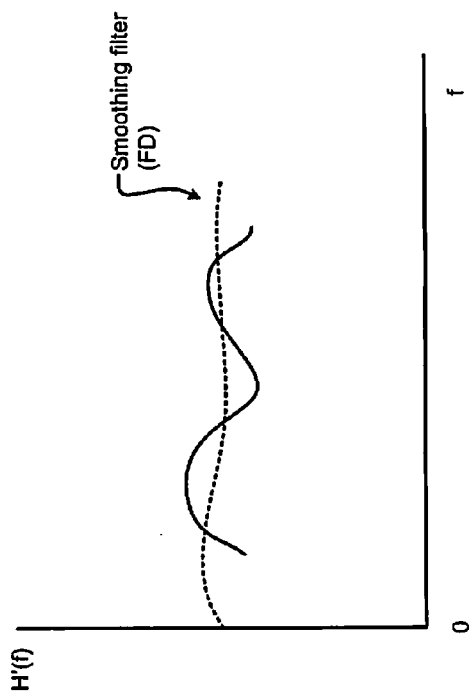
FIG. 6B is a frequency domain response of a smoothing type filter used in the system of FIG. 5.
Figure 6A:
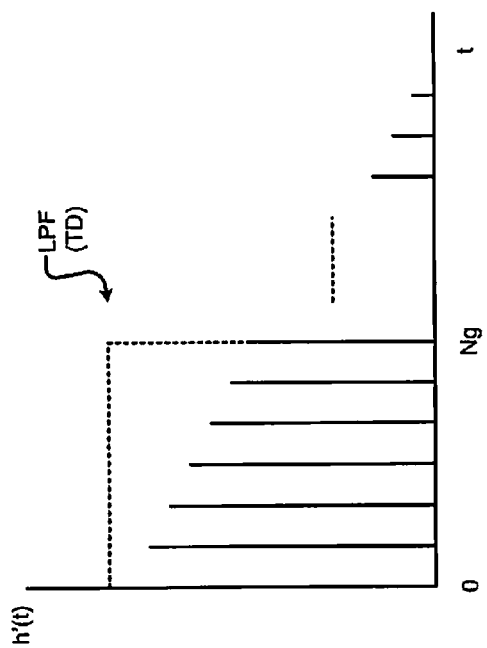
FIG. 6A is a time domain response of a low-pass type filter used in the system of FIG. 5.
Figure 6C:
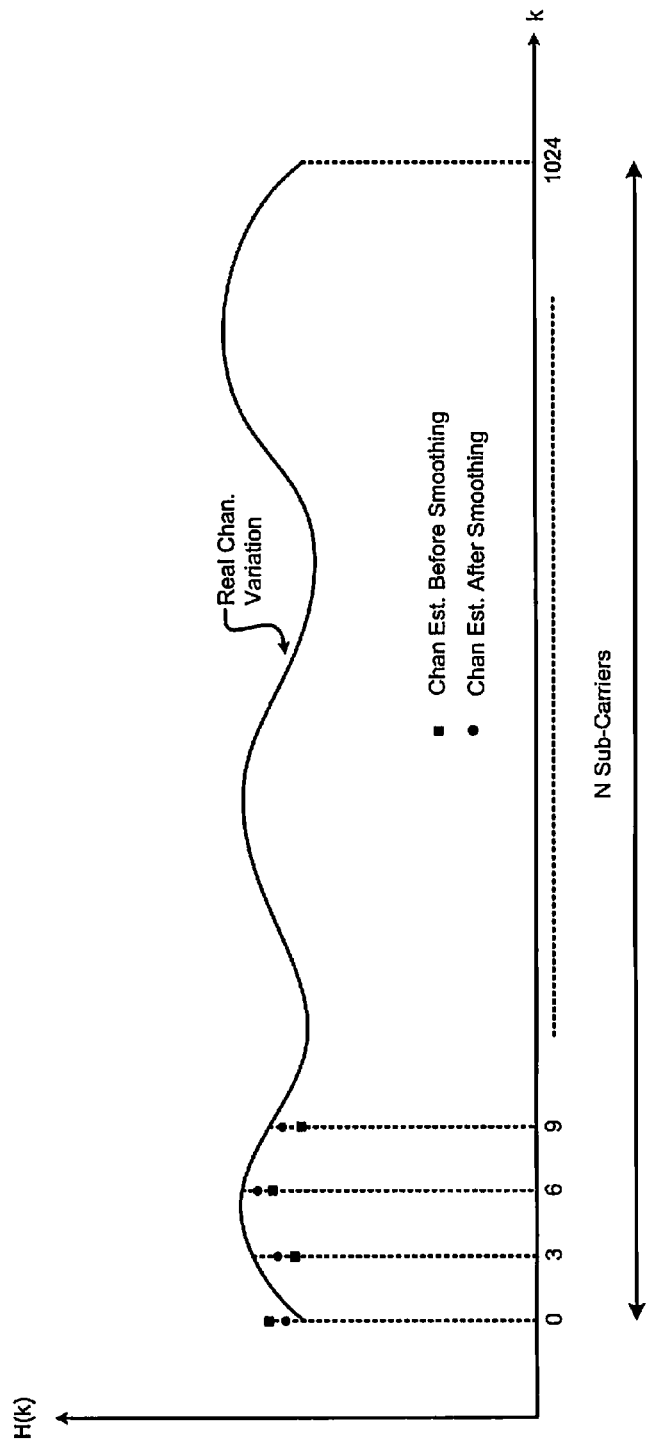
FIG. 6C shows a comparison of channel estimates before and after smoothing.

Referring now to FIGS. 6A-6C, the filtering performed by the IFFT module 164 and the matrix filter module 166 may be explained as follows. Specifically, the filtering performed by the matrix filter module 166 in the frequency domain is essentially a frequency transform of the filtering performed by the IFFT module 164 in the time domain.

In FIG. 6A, the IFFT module 164 may function as a low-pass type filter in the time domain that filters $(N_g+1)$ samples of the initial channel estimates, where $N_g$ is the size of the cyclic prefix. In FIG. 6B, the matrix filter module 166 may function as a smoothing filter in the frequency domain. The smoothing filter operation of the matrix filter module 166 is essentially a frequency transform of the time domain low-pass type filter operation of the IFFT module 164. The frequency transformation may be obtained by using a Fourier transform function.

In other words, the frequency response of FIG. 6B is a frequency transform (e.g., a Fourier transform) of the time domain response of FIG. 6A, and the low-pass type filter in the time domain is equivalent to the smoothing filter in the frequency domain. Accordingly, the IFFT module 164 having a time domain response of a low-pass filter is used when the first or the second pilot pattern is used, and the matrix filter module 166 having a frequency domain response of a smoothing filter is used when the third or the fourth pilot pattern is used. In FIG. 6C, a comparison of channel estimates before and after smoothing is shown. The channel estimates after smoothing are closer to the real channel response than that before smoothing.

The low-complexity ML joint estimation of channel and preamble sequence for the four pilot patterns and the segment detection is now mathematically explained in turn. Hereinafter, f, $H_i'$, and $H_i''$ are denoted by G, $\tilde{H}_i$, and $\hat{H}_{i,pilot}$, respectively.

When the first pilot pattern is used, where all the subcarriers are used as pilot subcarriers to transmit the preamble sequence, the energy of each pilot subcarrier may be considered to be equal to one. Accordingly, $X_i$ may be a unitary matrix (i.e., $X_i^H X_i = I_N$). The square error can be represented as follows.

$$S(h,i)=\|X_i^H Y - \tilde{F}h\|^2.$$

The final channel estimate $\hat{h}_i$ that minimizes the square error for a given preamble sequence index i is $\hat{h}_i = \tilde{F}^\dagger \tilde{H}_i$, where an initial frequency-domain channel estimate $\tilde{H}_i$ is $\tilde{H}_i = X_i^H Y$. Since $\tilde{F}^H \tilde{F} = I$, a pseudo-inverse of $\tilde{F}$ is $\tilde{F}^H$. The final channel estimate now becomes $\hat{h}_i = \tilde{F}^H \tilde{H}_i$.

The time-domain channel estimate can be obtained by calculating the first $N_g+1$ IDFT samples of the initial frequency-domain channel estimate. The corresponding square error can be expressed in terms of $\hat{h}_i$ as follows:

$$S(\hat{h}_i,i)=\|Y\|^2 - \|\hat{h}_i\|^2.$$

This square error expression shows that choosing the preamble sequence index that minimizes the square error is equivalent to choosing the preamble sequence index that maximizes the squared norm of the final channel estimate. Thus, the preamble sequence index estimate becomes $$\hat{i} = \arg\max_i \|\hat{h}_i\|^2.$$

This channel estimation does not require the calculation of a pseudo-inverse of $A_i$ for every i.

When the second pilot pattern is used, where the pilot subcarriers are regularly spaced with null subcarriers between the pilot subcarriers, let $W = X_i X_i^H$ be a diagonal matrix whose diagonal element has a value of 1 for a pilot subcarrier location and 0 for a null subcarrier location. The square error $S(h,i)$ can be expressed as follows:

$$S(h,i)=\|W(Y-X_i\tilde{F}h)\|^2 + \|(I-W)(Y-X_i\tilde{F}h)\|^2$$

Since $$(I-W)X_i=0,$$

$$\|(I-W)(Y-X_i\tilde{F}h)\|^2 = \|(I-W)Y\|^2,$$

which does not depend on h.

Thus, a modified square error $\tilde{S}(h,i)$ may be defined as follows:

$$\tilde{S}(h,i)=\|W(Y-X_i\tilde{F}h)\|^2.$$

Since $W=X_i X_i^H$ and $WX_i=X_i$, the modified square error can be represented as $$\tilde{S}(h,i)=\|X_i^H Y - W\tilde{F}h\|^2 = \|X_i^H Y - WFI_{N,N_g+1}h\|^2$$

As an example, when even numbered subcarriers are pilots and odd numbered subcarriers are nulls, $$WF = \frac{1}{2}F\begin{bmatrix} I_{N/2} & I_{N/2} \\ I_{N2} & I_{N/2} \end{bmatrix}.$$

Thus, $\tilde{S}(h,i)$ can also be represented as $$\tilde{S}(h,i)=\|X_i^H Y - A_1; 2FBh\|^2,$$

where $$B = \frac{1}{2}\begin{bmatrix} I_{N_g+1} \\ O_{N/2-N_g-1, N_g+1} \\ I_{N_g+1} \\ O_{N/2-N_g-1, N_g+1} \end{bmatrix}.$$

Since F is a unitary matrix, the modified square error is $$\tilde{S}(h,i)=\|F^H X_i^H Y - Bh\|^2$$

It can be easily shown that a pseudo-inverse of B is $$B^\dagger = 2I_{N_g+1,N}.$$

The channel estimate $\hat{h}_i$ that minimizes the modified square error for a given preamble sequence index i is $$\hat{h}_i = 2I_{N_g+1,N} F^H \tilde{H}_i = 2\tilde{F}^H \tilde{H}_i$$

where $\tilde{H}_i = X_i^H Y$. The time-domain channel estimate is given by calculating the first $N_g+1$ IDPT samples of the initial channel estimate and then multiplying them by a scaling factor of 2.

It can be shown that the corresponding modified square error can be expressed as $$\tilde{S}(\hat{h}_i,i) = \|WY\|^2 - \|\hat{h}_i\|^2.$$

Thus the preamble sequence index estimate is given as $$\hat{i} = \arg\max_i \|\hat{h}_i\|^2.$$

Again, this channel estimation does not require the calculation of a pseudo-inverse of $A_i$ for every i.

When the third pilot pattern is used, where the positions of the pilot subcarriers are arbitrary but fixed for all preamble sequences, the modified square error can be represented as $$\tilde{S}(h,i) = \|X_i^H Y - W\tilde{F}h\|^2.$$

Let $\tilde{W} \in \mathbb{C}^{N_p \times N}$ be a matrix having only nonzero rows of W. The modified square error is expressed in terms of $\tilde{W}$ as $$\tilde{S}(h,i) = \|\tilde{W}X_i^H Y - \tilde{\tilde{W}}\tilde{\tilde{F}}h\|^2.$$

For notational convenience, let $A = \tilde{\tilde{W}}\tilde{\tilde{F}}$. The channel estimate for a given i can be expressed as $$\hat{h}_i = A^\dagger \tilde{\tilde{W}}\tilde{\tilde{H}}_i,$$

where the pseudo-inverse $A^\dagger$ for a full rank matrix A is $A^\dagger = (A^H A)^{-1} A^H$. Since A does not depend on the preamble sequence index i, the pseudo-inverse $A^\dagger$ of A may be calculated only once.

By noting that $W = \tilde{W}^H \tilde{W}$, the channel estimate for given i can also be expressed as follows:

$$\hat{h}_i = (\tilde{F}^H W \tilde{F})^{-1} \tilde{F}^H \tilde{H}_i.$$

This equation shows that the time-domain channel estimate can be obtained by computing the $N_g+1$ IDFT samples of the initial frequency-domain channel estimate and then filtering with a matrix $(\tilde{F}^H W \tilde{F})^{-1}$. In many cases, calculating the frequency-domain channel estimate may be preferred to calculating the time-domain channel estimate.

The frequency-domain channel estimate is $$\hat{H}_i = \tilde{F}\hat{h}_i = \tilde{F}(\tilde{F}^H W \tilde{F})^{-1} \tilde{F}^H \tilde{H}_i.$$

The frequency-domain channel estimate at pilot subcarriers is $$\hat{H}_{i,pilot} = W\hat{H}_i = G\tilde{H}_i,$$

where $$G = W\tilde{F}(\tilde{F}^H W \tilde{F})^{-1} \tilde{F}^H.$$

The modified square error becomes $$\tilde{S}(\hat{h}_i, i) = \|\tilde{H}_i - \hat{H}_{i,pilot}\|^2.$$

It can be shown that the modified square error can be expressed as $$\tilde{S}(\hat{h}_i, i) = \|WY\|^2 - \|\hat{H}_{i,pilot}\|^2,$$

where $\hat{H}_{i,pilot} = G\tilde{H}_i$. Thus, the preamble sequence index estimate is given as $$\hat{i} = \arg\max_i \|\hat{H}_{i,pilot}\|^2.$$

Calculating the frequency-domain channel estimate at the pilot subcarriers is most computation intensive. Noting that matrix G has $N_p^2$ nonzero elements, when the number $N_p$ of pilots used is not much larger than $N_g+1$, the complexity of calculating the frequency-domain channel estimates can be less than that in the time-domain where the calculation includes IFFT, filtering with a matrix of size $(N_g+1) \times (N_g+1)$, followed by FFT.

Accordingly, the channel estimation for a given preamble sequence is done by calculating an initial frequency-domain channel estimate at pilot subcarriers and filtering the initial estimate with a filter G to obtain the final frequency-domain channel estimate. The filter G is a time domain low-pass type filter that removes all sample points at $n > N_g$, and is a smoothing filter in the frequency domain. When channel estimates in the frequency domain before and after using the smoothing filter are compared, considering finite channel duration within cyclic prefix length $N_g$, the channel estimates after smoothing are closer to the real channel response than that before smoothing.

The criterion for the preamble sequence estimation is finding the preamble sequence index for which the difference between the initial channel estimate and the final channel estimate is minimum. Another equivalent criterion is finding the preamble sequence index for which the magnitude of the final channel estimate is maximum.

When an incorrect preamble sequence is chosen, the initial channel estimate for each subcarrier can have a significantly different value from the channel estimates for adjacent subcarriers although the underlying channel varies smoothly over the frequency. The channel estimate after filtering can have significantly different value from the channel estimate before filtering.

On the other hand, when a correct preamble sequence is chosen, the channel estimate after smoothing will differ little from the channel estimate before smoothing. Thus, the square error $S(\hat{h}_i, i)$ that essentially represents the difference between the channel estimate before smoothing and after smoothing will be small for the correct preamble sequence index.

Additionally, if an incorrect preamble sequence is chosen, the channel estimate after filtering will have small values because the initial channel estimate for each subcarrier can have a significantly different value from the channel estimate for adjacent subcarriers. If, however, a correct preamble sequence is chosen, the magnitude of the channel estimate after filtering will not be much smaller than that of the channel estimate before filtering. The magnitude reduction due to filtering may result only from the background noise at $n > N_g$.

Alternatively, this joint ML estimation can also be explained in the time-domain as follows. For correct choice of preamble sequence, the time-domain channel estimate will be confined to the first $N_g+1$ samples in absence of background noise. The background noise can be spread over all time domain samples. So the difference between the final channel estimate and the initial channel estimate can be explained by the background noise component that does not lie on the space that is spanned by the complex exponential functions represented by the first $N_g+1$ time-domain samples.

On the other hand, for incorrect choice of preamble sequence, the initial channel estimate can be considered as the correct initial channel estimate plus the interference due to the incorrect choice of preamble sequence. This interference again can be spread over all time-domain samples. Thus, choosing the first $N_g+1$ samples will remove the frequency-domain interference components that do not lie on the space spanned by the complex exponential functions represented by the first $N_g+1$ time-domain samples.

Alternatively or additionally, other estimators may be used. For example, the ML channel estimator can be replaced by the MMSE channel estimator or a plain channel estimator that is based on the locally weighted averages of pilot subcarriers.

Specifically, for every i, the MMSE estimator may calculate the channel estimate $\hat{H}_i$ as a linear function of $\tilde{H}_i = X^H Y$, such that $$\hat{H}_i = R_{HH}(R_{HH} + \sigma_z^2 I_N)^{-1} \tilde{H}_i,$$

where $R_{HH} = E[HH^H]$ is the covariance of channel H. The index i that minimizes $\|\tilde{H}_i - \hat{H}_i\|^2$ may be chosen as the transmitted preamble sequence index. Here, the MMSE estimator may have a priori knowledge of the channel covariance and noise variance.

Again, the criterion for preamble sequence selection can be either choosing the value of i for which the difference between the initial and final channel estimate is smallest or the magnitude of the final channel estimate is largest. The ML estimator minimizes $S(h,i) = \|Y - X_i\tilde{F}h\|^2$, which leads to minimizing $\|\tilde{H}_i - \hat{H}_{i,pilot}\|^2$ and equivalently maximizing $\|\hat{H}_{i,pilot}\|^2$.

This equivalence does not necessarily hold for the MMSE estimator or the local averaging estimator. Since the metric used for optimization is different for each estimator, the estimate $\hat{H}_i$ is also different. Yet either of these two can be considered as a good criterion.

Finally, when the fourth pilot pattern is used, where the positions of the pilot subcarriers are different for different preamble sequence indices, let $W_i = X_i^H X_i$. Let W be a diagonal matrix whose (k,k)-th element is $$W_{k,k} = \begin{cases} 1, & \text{if } k \in \bigcup_{i=0}^{J-1} P_i \\ 0, & \text{otherwise,} \end{cases}$$

where J is the total number of preamble sequence candidates (e.g., J=114 in WiMAX systems), and $P_i$ is the set of pilot subcarrier indices for the preamble sequence index i. $P_i$ can be different for each preamble sequence. This matrix W has a value of 1 if it corresponds to the location of a pilot for any preamble sequence.

A modified square error $\tilde{S}(h,i)$ can be defined as follows:

$$\tilde{S}(h,i) = \|W(Y - X_i \tilde{F} h)\|^2.$$

This modified square error is further partitioned to two terms:

$$\tilde{S}(h,i) = \|W_i(Y - X_i \tilde{F} h)\|^2 + \|(W - W_i)(Y - X_i \tilde{F} h)\|^2.$$

The first term can be simplified to $$\|W_i(Y - X_i \tilde{F} h)\|^2 = \|X_i^H Y - W_i \tilde{F} h\|^2,$$

whereas the second term can be simplified to $$\|(W - W_i)(Y - X_i \tilde{F} h)\|^2 = \|(W - W_i) Y\|^2$$

Thus, the modified square error now has the second term as follows:

$$\tilde{S}(h,i) = \|X_i^H Y - W_i \tilde{F} h\|^2 + \|(W - W_i) Y\|^2.$$

The channel estimate that minimizes the first term can be expressed as $$\hat{h}_i = (\tilde{F}^H W_i \tilde{F})^{-1} \tilde{F}^H X_i^H Y.$$

The frequency-domain channel estimate at pilot subcarriers is $$\hat{H}_i = \tilde{F}(\tilde{F}^H W_i \tilde{F})^{-1} \tilde{F}^H \tilde{H}_i.$$

The frequency-domain channel estimate at pilot subcarriers is $$\hat{H}_{i,pilot} = W_i \hat{H}_i = G \tilde{H}_i,$$

where $$G_i = W_i \tilde{F}(\tilde{F}^H W_i \tilde{F})^{-1} \tilde{F}^H W_i.$$

Here, $G_i$ depends on the preamble sequence index i. However, since the number of distinct pilot sets is small, the number of distinct $W_i$ and $G_i$ is small as well. For example, WiMAX has three distinct pilot subcarrier sets. Thus, $G_i$'s may be calculated only for three different i's that represent different preamble subcarrier sets. Although the channel estimate that minimizes the first term can be obtained similarly as when the third pilot pattern is used, the modified square error may be calculated differently.

The corresponding modified square error can be expressed simply in terms of $\hat{H}_i$ as follows:

$$\tilde{S}(\hat{h}_i,i) = \|WY - X_i \hat{H}_{i,pilot}\|^2.$$

The modified square error can also be expressed as $$\tilde{S}(\hat{h}_i,i) = \|WY\|^2 - \|\hat{H}_{i,pilot}\|^2,$$

where $\hat{H}_{i,pilot} = G \tilde{H}_i$. Thus, the preamble sequence index estimate is given as $$\hat{i} = \arg_i \max \|\hat{H}_{i,pilot}\|^2.$$

Finally, the segment detection is mathematically explained as follows. In WiMAX systems, the subcarriers can be partitioned into three segments to reduce interference. Each base station transmits a preamble that uses only every third subcarrier corresponding to its segment. The mobile station can differentiate the signal from interference transmitted by adjacent base stations and detect the correct base station and segment. The set of pilot subcarrier indices $P_i$ is equal to one of three sets, $$\Pi_s = \{3n + s | n = 0, 1, 2, 3, \ldots\} \text{ for } s = 0, 1 \text{ or } 2,$$

where s represents a segment and the corresponding subcarrier set.

The joint ML estimation can provide a convenient way to detect a segment as well as a preamble sequence. Specifically, the joint ML estimator has a property of $$\tilde{S}(\hat{h}_i,i) + \|\hat{H}_{i,pilot}\|^2 = \|WY\|^2,$$

where $\|WY\|^2$ is a constant for every i. Minimizing $\tilde{S}(\hat{h}_i,i)$ is then equivalent to maximizing $\|\hat{H}_{i,pilot}\|^2$ for the joint ML estimator.

A conventional method for segment detection is to compute the total power of the possible subcarriers in the preamble and then choose the segment that has the maximum total power. Using the low-complexity joint ML estimators, the preamble total power is given in $\|\hat{H}_{i,pilot}\|^2$. Based on the equivalence of minimizing $\tilde{S}(\hat{h}_i,i)$ and maximizing $\|\hat{H}_{i,pilot}\|^2$, the joint ML estimator simultaneously provides segment detection and the joint estimation of preamble sequence and channel.

Figure 7:
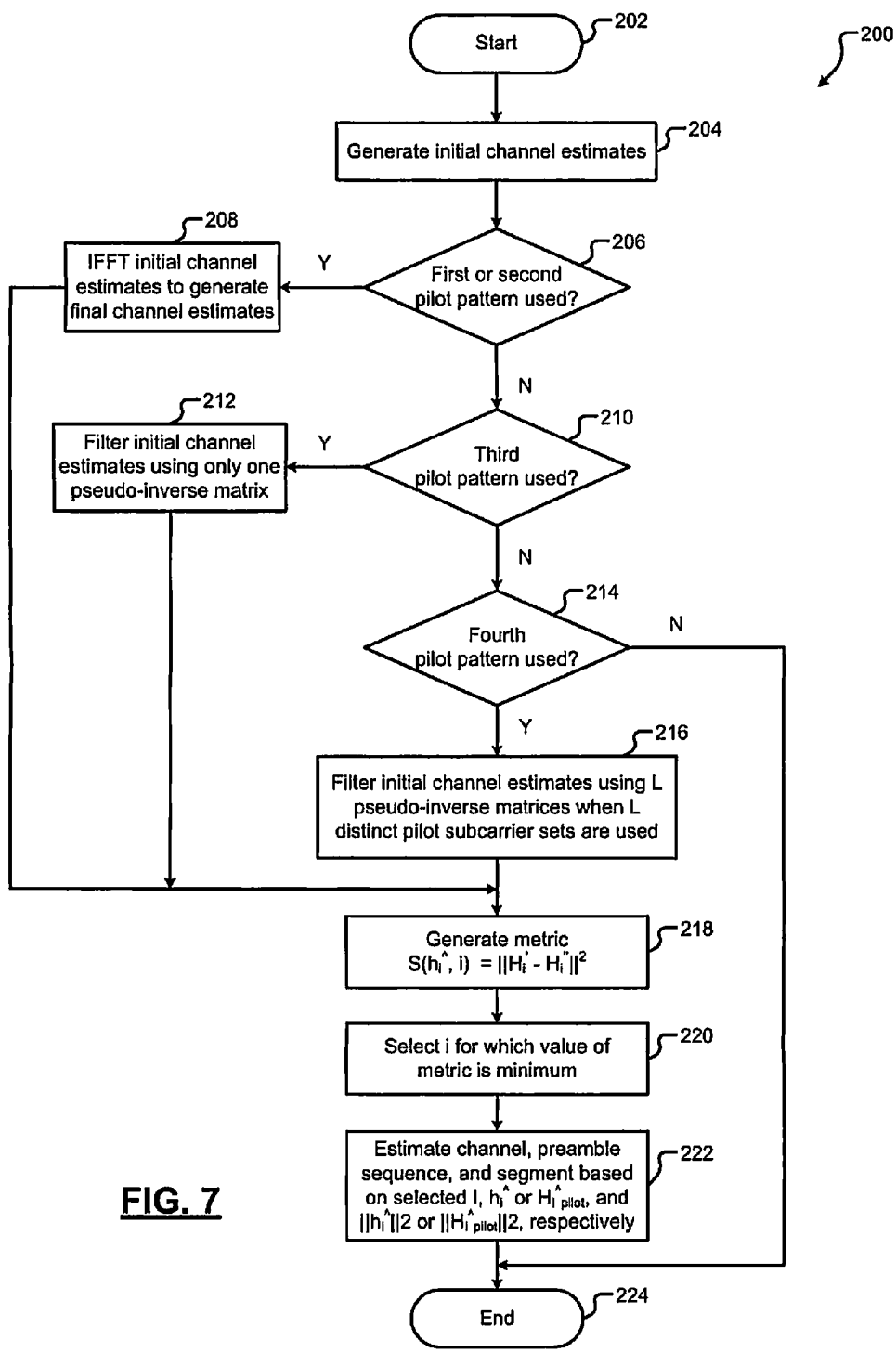
FIG. 7 is a flowchart of an exemplary method for jointly estimating channel and preamble sequence using low-complexity joint ML estimators according to the present disclosure.

Referring now to FIG. 7, a method 200 for estimating channel and preamble sequence using low-complexity joint ML estimators according to the present disclosure is shown. The method 200 begins in step 202. The estimation module 154 generates initial channel estimates in step 204 based on the input signals received by the PHY module 150 via the antenna 152.

The filter selection module 160 determines in step 206 whether the first or the second pilot pattern is used. If the result of step 206 is true, the filter selection module 160 selects the IFFT module 164 and deselects the matrix filter module 166, and the IFFT module 164 filters the initial channel estimates and generates final channel estimates in step 208 without using any pseudo-inverse matrix.

If, however, the result of step 206 is false, the filter selection module 160 determines in step 210 whether the third pilot pattern is used. If the result of step 210 is true, the filter selection module 160 selects the matrix filter module 166 and deselects the IFFT module 164, and the matrix filter module 166 filters the initial channel estimates using only one pseudo-inverse matrix and generates final channel estimates in step 212.

If, however, the result of step 210 is false, the filter selection module 160 determines in step 214 whether the fourth pilot pattern is used. If the result of step 214 is true, the filter selection module 160 selects the matrix filter module 166 and deselects the IFFT module 164, and the matrix filter module 166 filters the initial channel estimates using L pseudo-inverse matrix and generates final channel estimates in step 216, where L is the number of distinct pilot subcarrier sets used. If, however, the result of step 214 is false, the method 200 ends in step 224.

At the end of steps 208, 212, or 216, the control module 162 generates the metric $S(h_i\hat{},i)=\|H_i'-H_i''\|^2$ in step 218 in time domain when the first or the second pilot pattern is used or in frequency domain when the third or the fourth pilot pattern is used. In step 220, the control module 162 selects the value of i for which the value of the metric is minimum. In step 222, the control module 162 estimates the preamble sequence received in the input signal, the channel, and the segment that transmitted the detected preamble sequence based on the selected value of i, the corresponding values of $h_i\hat{}$ or $H_{i\ pilot}\hat{}$, and $\|h_i\hat{}\|^2$ or $\|H_{i\ pilot}\hat{}\|^2$, respectively. The method 200 ends in step 224.

Figure 8A:
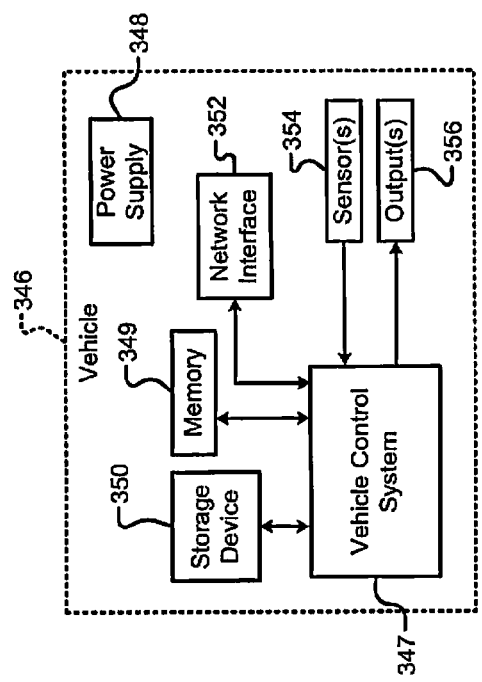
FIG. 8A is a functional block diagram of a vehicle control system.
Figure 8B:
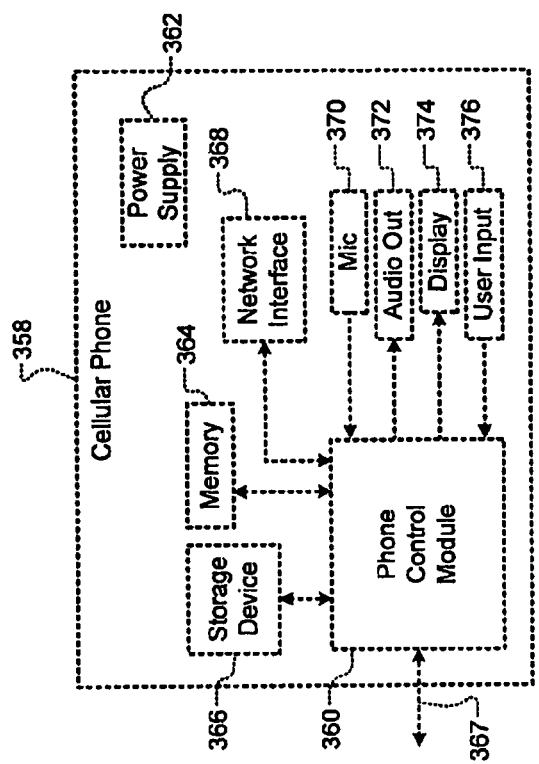
FIG. 8B is a functional block diagram of a cellular phone.
Figure 8C:
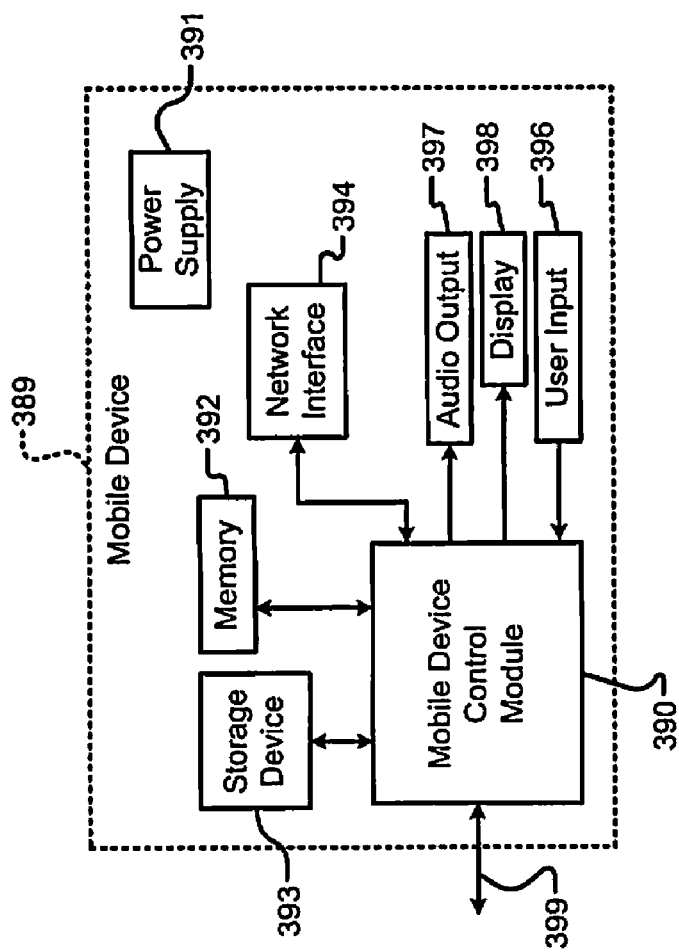
FIG. 8C is a functional block diagram of a mobile device.

Referring now to FIGS. 8A-8C, various exemplary implementations incorporating the teachings of the present disclosure are shown. In FIG. 8A, the teachings of the disclosure may be implemented in a network interface 352 of a vehicle 346. The vehicle 346 may include a vehicle control system 347, a power supply 348, memory 349, a storage device 350, and the network interface 352. The network interface 352 may include a wireless local area network interface, including an interface for OFDMA systems such as WiMAX, and an antenna (not shown).

The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, brake parameters, etc.

The power supply 348 provides power to the components of the vehicle 346. The vehicle control system 347 may store data in memory 349 and/or the storage device 350. Memory 349 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 350 may include an optical storage drive, such as a DVD drive, and/or a hard disk drive (HDD). The vehicle control system 347 may communicate externally using the network interface 352.

In FIG. 8B, the teachings of the disclosure can be implemented in a network interface 368 of a cellular phone 358. The cellular phone 358 includes a phone control module 360, a power supply 362, memory 364, a storage device 366, and a cellular network interface 367. The cellular phone 358 may include the network interface 368, a microphone 370, an audio output 372 such as a speaker and/or output jack, a display 374, and a user input device 376 such as a keypad and/or pointing device. When the network interface 368 includes a wireless local area network interface, including an interface for OFDMA systems such as WiMAX, an antenna (not shown) may be included.

The phone control module 360 may receive input signals from the cellular network interface 367, the network interface 368, the microphone 370, and/or the user input device 376. The phone control module 360 may process signals, including encoding, decoding, filtering, and/or formatting, and generate output signals. The output signals may be communicated to one or more of memory 364, the storage device 366, the cellular network interface 367, the network interface 368, and the audio output 372.

Memory 364 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 366 may include an optical storage drive, such as a DVD drive, and/or a hard disk drive (HDD). The power supply 362 provides power to the components of the cellular phone 358.

In FIG. 8C, the teachings of the disclosure can be implemented in a network interface 394 of a mobile device 389. The mobile device 389 may include a mobile device control module 390, a power supply 391, memory 392, a storage device 393, the network interface 394, and an external interface 399. When the network interface 394 includes a wireless local area network interface, including an interface for OFDMA systems such as WiMAX, an antenna (not shown) may be included.

The mobile device control module 390 may receive input signals from the network interface 394 and/or the external interface 399. The external interface 399 may include USB, infrared, and/or Ethernet. The input signals may include compressed audio and/or video, and may be compliant with the MP3 format. Additionally, the mobile device control module 390 may receive input from a user input 396 such as a keypad, touchpad, or individual buttons. The mobile device control module 390 may process input signals, including encoding, decoding, filtering, and/or formatting, and generate output signals.

The mobile device control module 390 may output audio signals to an audio output 397 and video signals to a display 398. The audio output 397 may include a speaker and/or an output jack. The display 398 may present a graphical user interface, which may include menus, icons, etc. The power supply 391 provides power to the components of the mobile device 389. Memory 392 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 393 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A mobile station comprising:
   an estimation module configured to (i) receive an input signal having subcarriers, and (ii) generate first channel estimates based on the input signal, wherein the subcarriers are selectively used by a base station to transmit preamble sequences when communicating with the mobile station;

a filter module including a first filter and a second filter, wherein the first filter or the second filter is configured to selectively (i) filter the first channel estimates and (ii) generate second channel estimates; and a filter selection module configured to select the first filter or the second filter according to a total number of the subcarriers used to transmit the preamble sequences.

2. The mobile station of claim 1, wherein the first filter and the second filter are configured to (i) filter the first channel estimates and (ii) generate the second channel estimates in a time domain and a frequency domain, respectively.

3. The mobile station of claim 1, wherein the filter selection module is configured to select the first filter in response to all of the subcarriers being used to transmit the preamble sequences.

4. The mobile station of claim 1, wherein the filter selection module is configured to select the first filter in response to every $Q^{th}$ of the subcarriers being used to transmit the preamble sequences, where Q is an integer greater than 1.

5. The mobile station of claim 1, wherein the first filter includes an Inverse Fast Fourier Transform module configured to (i) filter the first channel estimates and (ii) generate the second channel estimates.

6. The mobile station of claim 1, wherein the first filter has a time domain response of a low-pass filter, and wherein the second filter has a frequency domain response of a smoothing filter.

7. The mobile station of claim 1, wherein when the number of the subcarriers is N, and wherein in response to L sets of M of the N subcarriers being used to transmit the preamble sequences, the filter selection module is configured to select the second filter, where N, M, and L are integers, N and M are greater than 1, $L \geq 1$, and N>M>L.

8. The mobile station of claim 7, wherein the second filter includes a matrix filter module configured to:
generate L filter matrices based on the input signal,
filter the first channel estimates, and
generate the second channel estimates based on the L filter matrices.

9. The mobile station of claim 1, further comprising a control module configured to:
generate a metric based on (i) the first channel estimates and (ii) the second channel estimates, and
generate joint maximum likelihood estimates of (i) one of the preamble sequences and (ii) a channel based on the metric.

10. The mobile station of claim 9, wherein the control module is configured to generate the joint maximum likelihood estimates by selecting a preamble sequence index that minimizes the metric.

11. The mobile station of claim 9, wherein the control module is configured to detect a segment that transmitted the one of the preamble sequences based on at least one of (i) the metric and (ii) the joint maximum likelihood estimates.

12. The mobile station of claim 9, wherein the control module is configured to generate the joint maximum likelihood estimates based on at least one of (i) a joint maximum likelihood estimator and (ii) a minimum mean square error estimator.

13. The mobile station of claim 12, wherein the control module is configured to select the at least one of (i) the joint maximum likelihood estimator and (ii) the minimum mean square error estimator based on the number of the subcarriers used to transmit the preamble sequences.

14. The mobile station of claim 1, wherein the estimation module is configured to generate the first channel estimates by dividing the input signal by the preamble sequences.

15. The mobile station of claim 1, wherein the subcarriers are selectively modulated with the preamble sequences using Orthogonal Frequency Division Multiplexing by the base station.

16. A method comprising:
receiving an input signal having subcarriers that are selectively used to transmit preamble sequences;
generating first channel estimates based on the input signal;
selecting one of a first filter and a second filter according to a total number of the subcarriers used to transmit the preamble sequences;
filtering the first channel estimates using the first filter or the second filter; and
generating second channel estimates.

17. The method of claim 16, further comprising generating the second channel estimates by filtering the first channel estimates in a time domain using the first filter.

18. The method of claim 16, further comprising generating the second channel estimates by filtering the first channel estimates in a frequency domain using the second filter.

19. The method of claim 16, further comprising selecting the first filter in response to all of the subcarriers being used to transmit the preamble sequences.

20. The method of claim 16, further comprising selecting the first filter in response to every $Q^{th}$ of the subcarriers being used to transmit the preamble sequences, where Q is an integer greater than 1.

21. The method of claim 16, further comprising generating the second channel estimates by filtering the first channel estimates using an Inverse Fast Fourier Transform.

22. The method of claim 16, further comprising generating the second channel estimates by filtering the first channel estimates using the first filter having a time domain response of a low-pass filter.

23. The method of claim 16, further comprising generating the second channel estimates by filtering the first channel estimates using the second filter having a frequency domain response of a smoothing filter.

24. The method of claim 16, further comprising selecting the second filter in response to (i) the number of the subcarriers being N and (ii) L sets of M of the N subcarriers being used to transmit the preamble sequences, where N, M, and L are integers, N and M are greater than 1, $L \geq 1$, and N>M>L.

25. The method of claim 24, further comprising:
generating L filter matrices based on the input signal; and
generating the second channel estimates by filtering the first channel estimates based on the L filter matrices.

26. The method of claim 16, further comprising:
generating a metric based on the first channel estimates and the second channel estimates; and
generating joint maximum likelihood estimates of (i) one of the preamble sequences and (ii) a channel based on the metric.

27. The method of claim 26, further comprising generating the joint maximum likelihood estimates by selecting a preamble sequence index that minimizes the metric.

28. The method of claim 26, further comprising detecting a segment that transmitted the one of the preamble sequences based on at least one of (i) the metric and (ii) the joint maximum likelihood estimates.

29. The method of claim 26, further comprising generating the joint maximum likelihood estimates based on at least one of (i) a joint maximum likelihood estimator and (ii) a minimum mean square error estimator.

30. The method of claim 29, further comprising selecting the at least one of (i) the joint ML estimator and (ii) the minimum mean square error estimator based on the number of the subcarriers used to transmit the preamble sequences.

31. The method of claim 16, further comprising generating the first channel estimates by dividing the input signal by the preamble sequences.

32. The method of claim 16, further comprising modulating the subcarriers with the preamble sequences using Orthogonal Frequency Division Multiplexing.

* * * * *